C. H. FOSTER.
SHOCK ABSORBING DEVICE.
APPLICATION FILED JULY 21, 1911.
1,130,724.
Patented Mar. 9, 1915.
2 SHEETS—SHEET 1.
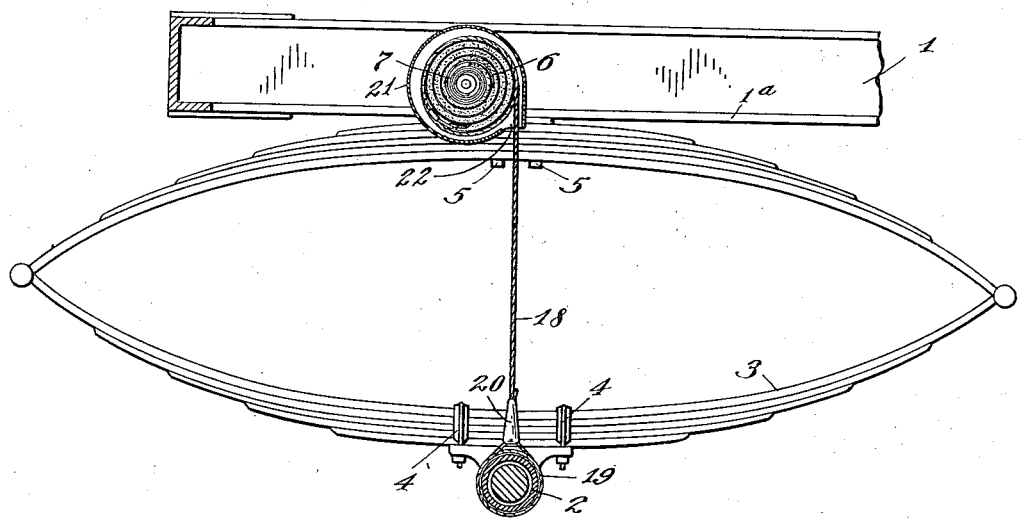
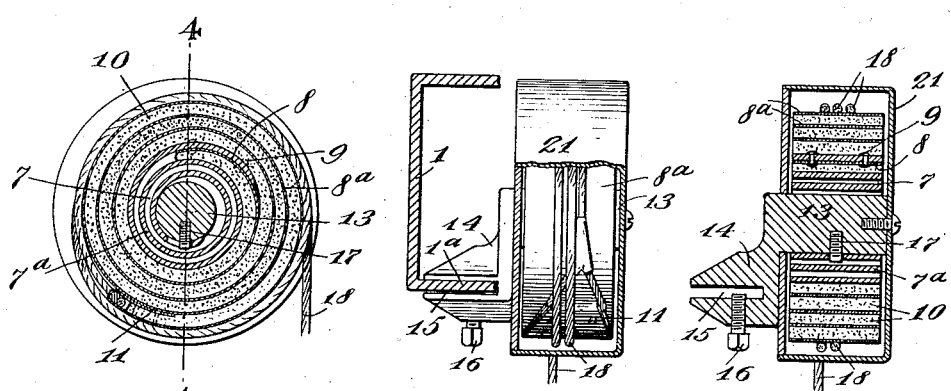
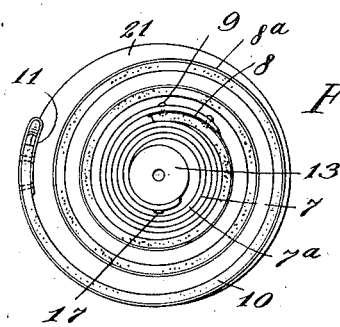
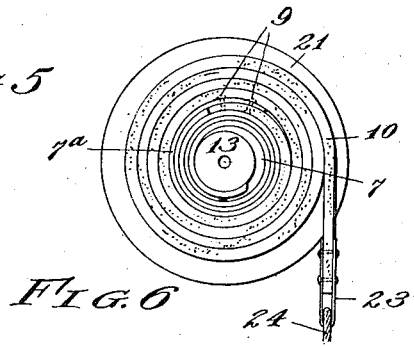
WITNESSES:
Brennan B. West.
A. L. Lord.
INVENTOR,
Claud H. Foster
By Hull & Smith
ATTYS.

C. H. FOSTER.
SHOCK ABSORBING DEVICE.
APPLICATION FILED JULY 21, 1911.
1,130,724.
Patented Mar. 9, 1915.
2 SHEETS—SHEET 2.
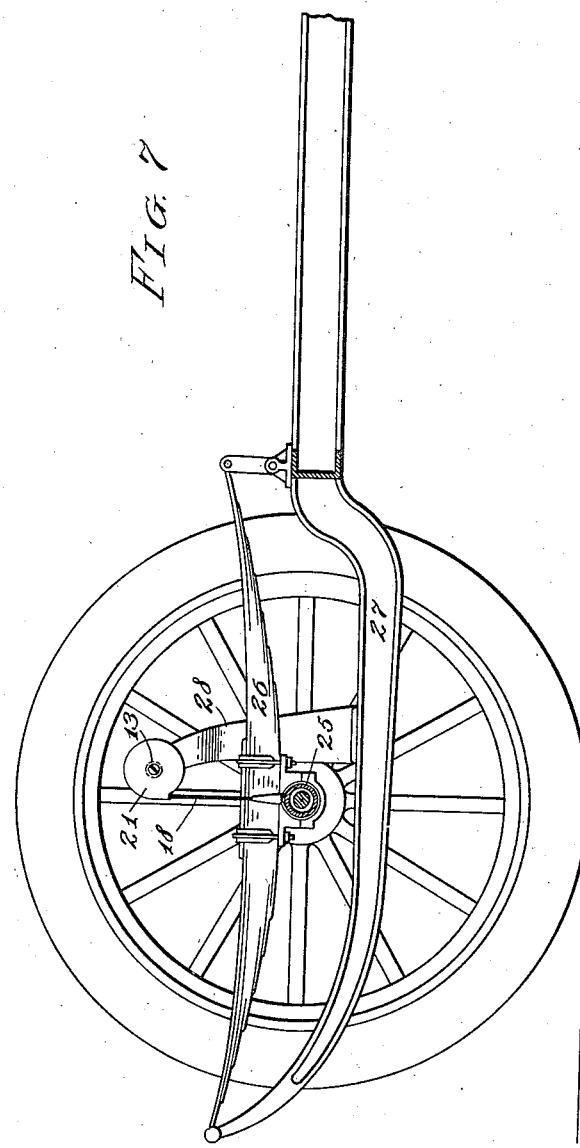

UNITED STATES PATENT OFFICE.

CLAUD H. FOSTER, OF CLEVELAND, OHIO.

SHOCK-ABSORBING DEVICE.

1,130,724.         Specification of Letters Patent.     Patented Mar. 9, 1915.

Application filed July 21, 1911. Serial No. 639,702.

*To all whom it may concern:*

Be it known that I, CLAUD H. FOSTER, a citizen of the United States, residing at Cleveland, in the county of Cuyahoga and State of Ohio, have invented a certain new and useful Improvement in Shock-Absorbing Devices, of which the following is a full, clear, and exact description, reference being had to the accompanying drawings.

This invention relates to shock absorbing devices, such as are interposed between the axles and bodies of vehicles (as well as between other relatively movable members) for the purpose of reducing the extent of vibration between these relatively movable members, whereby injury to the springs and excessive and injurious vibration of the springs and the connected members are prevented.

The invention has for one of its objects the production of a device of this character which is extremely simple in construction and efficient in operation, which may be easily assembled and conveniently applied to and removed from the parts with which it may be associated, and which will successfully withstand all ordinary incidents of use.

Still further and more generally speaking, the invention may be defined as consisting of the combinations of elements embodied in the annexed claims and illustrated, in two modifications, in the drawing forming part hereof wherein—

Figure 1 represents a side elevation of a part of a vehicle frame having my invention applied thereto, the axle being shown in section; Fig. 2 represents an enlarged sectional view of one form of the shock absorbing device; Fig. 3 a view in side elevation of said device, the wall of the inclosing casing being broken away; Fig. 4 a sectional detail corresponding to the line 4—4 of Fig. 2; Fig. 5 an elevation of the spring and strap disconnected from the vehicle, the spring being shown as opened up; Fig. 6 a similar view of a modified form of the invention shown in Fig. 2, and Fig. 7 a view similar to Fig. 1, showing the invention applied to an "underhung" frame.

The device consists essentially of a spiral or convolute spring, one end of which is operatively connected to one of the parts with which it is associated and the other end of which is operatively connected to the other part, the convolutions of the spring being given a particular arrangement whereby, upon any movement tending to separate the connected parts, a dragging frictional resistance will occur between the outermost convolutions, the resistance increasing as the parts are separated farther and the force or shock tending to close or contract the spring being transmitted to a relatively open and cushioning central portion thereof. In the construction shown in the first five figures of the drawings, the spring is made of two sections, namely; an inner section comprising several convolutions of stiff metal and an outer section comprising a plurality of convolutions of relatively light, yielding metal, preferably spring metal. Interposed between the convolutions of this outer section as well as between the outermost convolutions of the inner section and the innermost convolution of the outer section there is a strap or band of friction material which, being gripped between the adjacent convolutions of the spring, exerts a dragging friction opposing the closing of the spring through the separation of the parts connected thereto. With the spring constructed as thus illustrated and described it will be apparent that any movement tending to close or contract the spring will be resisted by the increasing friction between the outer convolutions of the spring. There is thus produced a yielding resistance to the separation of the parts with which the spring may be associated, which yielding resistance is transmitted gradually and progressively to the central open portion of the spring, with the result that such central portion is protected against the effects of sudden shocks and is enabled to absorb the shocks or strains applied to the outer portion of the spring without injury or rupture.

In Fig. 1 of the drawing, a device constructed in accordance with my invention is shown as applied to the axle and body of a vehicle for the purpose of preventing violent separation of these members on rebound, thereby preventing the breaking of the vehicle spring and insuring ease and comfort of riding. In the drawing, 1 denotes one of the side frames of the vehicle body, which may be of any ordinary construction, a channel beam being shown.

2 denotes the axle and 3 one of the springs, the form illustrated being an elliptic spring having its lower section connected to the axle by means of clips 4 in the usual manner and having its upper section connected to the frame 1, as by means of bolts 5.

6 denotes generally a spiral or convolute spring interposed between the vehicle frame and axle. When connected to the vehicle members the inner convolutions of the spring are generally under compression but the central portion of the spring is open, as shown at 7. The inner section 7a of the spring is of relatively stiff and strong metal and has connected to its outer end portion the inner end 8 of the outer section 8a, said sections being conveniently united by means of rivets 9. Within the convolutions of the outer spring section there is located a flexible strap or band 10 of friction material, such as leather or belting, the inner end of this band being conveniently secured in place by the rivets 9. At their outer ends, the outer section and the band or strap 10 are secured together. A convenient manner of so securing them is by bending the end portion of the outer spring section back upon itself, as shown at 11, and riveting the end of the band or strap between this end and the body of the outer spring section. The inner end of the inner spring section 7a is secured to a stud 13, which may be conveniently secured to the side frame 1. As shown more particularly in Figs. 3 and 4, the stud may be attached to the frame by means of an angular extension 14 having an elongated slot 15 therein for the reception of one of the flanges (1a) of the frame 1, the set screw 16 being provided for clamping the said extension to the flange. For the purpose of securing the inner end of the spring to the stud, a screw 17 may be employed, extending through the inner end of the spring section 7a and into the body of the stud.

Before being subjected to any strain, the compound spring will tend to assume the position shown in Fig. 5, the resiliency of the light outer section tending to open up the outer convolutions of the spring and keep the friction material 10 out of contact with the adjacent inner convolutions. In applying the device to a vehicle, however, the spring is generally placed under compression, the compression being generally proportional to the movement of the vehicle spring from its normal position to its fully deflected or elongated position. The flexible cable 18 (which is connected to the loop formed at the outer end of the section 8a) should generally be drawn down a distance of several inches against the action of the spring (after the outer convolutions are brought into gripping contact) before connecting the cable to the axle. By so connecting the spring, the latter will always be under compression and will take up the slack of the flexible connection or cable 18 whenever the spring 3 is elongated or deflected. Furthermore, under all normal conditions of the shock absorbing device when so connected, the outermost convolutions are in gripping engagement. The length of the cable 18 can be easily adapted for varying styles of vehicle springs. In practice, one or more turns of the cable 18 will be taken around the outermost convolution 8a, and the cable may be conveniently secured to the axle by taking one or more turns around the latter, as shown at 19, the end of the cable being secured to the body thereof, as by means of a clip 20.

For the purpose of protecting the parts from dust, the spring and the central stud may be inclosed within a box 21 of sheet metal, the box being provided with an opening 22 for the cable.

In Fig. 6 there is shown a modification of my invention wherein the strap or band 10 is connected directly to the outer end of the spring 7a, as by means of the rivets 9. When so constructed, several turns of the band 10 will be taken around the outermost convolution of the spring 7a, the turns being in contact and, in fact, in gripping engagement with each other. The outermost end of the strap 10 is provided with a sheet metal loop 23, similar to that provided at the end of the outer spring section in the preceding modification, the cable 24 being connected to said loop.

In both modifications of the invention there is provided a spring having a relatively open center, with a flexible device, such as a strap, having several convolutions around the central spring, which convolutions serve to frictionally retard the contraction of the central spring through the force applied to the strap to contract the spring.

While I have shown my device applied to a vehicle, it will be apparent that it may be applied to other relatively movable parts for applying a friction brake action to resist or prevent excessive movement between such parts. In Fig. 7 of the drawing I have shown my invention applied to an underhung frame and axis. In this application of my invention, 25 denotes the axle, 26 the spring and 27 the underhung frame of a vehicle. The cable 18 is shown as connected to the axle and the stud 13 to an arm 28 carried by the frame and projecting above the axle. By thus connecting the shock absorbing device, it will oppose the rebounding action of the spring 26.

Having thus described my invention, what I claim is:

1. The combination, with a pair of relatively movable members, of a shock absorbing device comprising a spiral spring having its inner portion operatively connected with one of such members, a flexible friction band operatively connected to the outer end of said spring and wrapped spirally around the spring a plurality of times, and means connecting said band and the other member.

2. The combination, with a pair of relatively movable members, of a shock absorbing device comprising a spiral spring the inner portion of which is of relatively stiff metal and the outer portion of which is of relatively yielding metal, friction material interposed between convolutions of the outer spring section, means connecting the inner end of the inner spring section with one of the members, and a connection between the outer portion of the outer section and the other member.

3. The combination, with a pair of relatively movable members, of a shock absorbing device comprising a spiral spring the inner portion of which is of relatively stiff material having convolutions spaced apart and the outer portion of which is of relatively yielding material, means connecting the inner end of the spring with one of the members, friction material interposed between the outermost convolutions of the spring, and means connecting the outer end of the spring with the other member.

4. The combination, with a pair of relatively movable members, of a shock absorbing device comprising a spiral spring the inner portion of which is of relatively stiff material having its inner convolutions spaced apart and the outer portion of which is of relatively yielding material, means connecting the inner end of the spring with one of the members, and means connecting the outer end of the spring with the other member.

5. The combination, with a pair of relatively movable members, of a shock absorbing device comprising a spiral spring having a relatively open central portion, means connecting the inner end of the spring to one of the members, and a flexible device connected to said spring and wrapped spirally around the same a plurality of times and operatively connected to the other member.

6. The combination, with a pair of relatively movable members, of a shock absorbing device comprising a spiral spring having its inner portion operatively connected with one of the aforesaid members, a strip of yielding metal secured to the outer end of said spring and extending around said spring a plurality of times, and a connection between said yielding strip and the other member.

7. The combination, with a pair of relatively movable members, of a shock absorbing device comprising a spiral spring the inner convolutions whereof are normally out of engagement, a strip of yielding metal connected with the outer end of said spring, a flexible band also connected to the outer end of said spring and being arranged within the yielding metal strip, said strip and band being wrapped around said spring, and means flexibly connecting said strip and said band to the other member.

8. The combination, with a pair of relatively movable members, of a shock absorbing device comprising a spiral spring the inner convolutions whereof are normally out of engagement, a compound strip of yielding metal and friction material connected to the outer end of the spring and wrapped around the spring a plurality of times, and a cable connecting the outer end of the compound strip to the other member.

9. The combination, with a vehicle frame and axle, of a shock absorbing device comprising a spiral spring the inner portion whereof is of relatively stiff material having its convolutions normally out of engagement and the outer portion whereof is of relatively yielding material, means connecting one end of the spring to the vehicle axle, and means connecting the other end of the spring to the frame at a point above the axle.

In testimony whereof, I hereunto affix my signature in the presence of two witnesses.

CLAUD H. FOSTER.

Witnesses:
J. B. HULL,
BRENNAN B. WEST.